US012636624B2

(12) United States Patent
Bravin et al.

(10) Patent No.: US 12,636,624 B2
(45) Date of Patent: May 26, 2026

(54) ULTRAFINE-BUBBLE CAVITATOR

(71) Applicant: Kairospace Technologies, Inc., Casper, WY (US)

(72) Inventors: Juan Ignacio Bravin, Las Vegas, NV (US); Jeremy Pfeiffer, Las Vegas, NV (US); Russell Gries, Las Vegas, NV (US)

(73) Assignee: Kairospace Technologies, Inc., Casper, WY (US)

( * ) Notice: Subject to any disclaimer, the term of this patent is extended or adjusted under 35 U.S.C. 154(b) by 315 days.

(21) Appl. No.: 18/630,844

(22) Filed: Apr. 9, 2024

(65) Prior Publication Data

US 2024/0350990 A1 Oct. 24, 2024

Related U.S. Application Data

(60) Provisional application No. 63/460,997, filed on Apr. 21, 2023, provisional application No. 63/463,839, filed on May 3, 2023.

(51) Int. Cl.
*B01F 25/312* (2022.01)
*B01F 23/2375* (2022.01)
*C02F 1/34* (2023.01)

(52) U.S. Cl.
CPC .. *B01F 25/312522* (2022.01); *B01F 23/2375* (2022.01); *B01F 25/3121* (2022.01); *C02F 1/34* (2013.01)

(58) Field of Classification Search
CPC .............. B01F 23/2323; B01F 23/2375; B01F 25/3121; B01F 25/312522; B01F 25/3141;

(Continued)

(56) References Cited

U.S. PATENT DOCUMENTS 6,425,505 B1 * 7/2002 Heaslip .................. B22D 41/50
222/606
6,502,979 B1 * 1/2003 Kozyuk .............. B01F 25/4413
366/176.2

(Continued)

FOREIGN PATENT DOCUMENTS

CN 103954162 B * 10/2015
EP 4260934 A1 * 10/2023

OTHER PUBLICATIONS

Machine English Translation of CN 103954162 B (Year: 2015).*

*Primary Examiner* — Charles S Bushey
(74) *Attorney, Agent, or Firm* — Fish IP Law, LLP; Tomas A. Prieto

(57) ABSTRACT

A cavitator utilizes hydrodynamic effects to create a compression-decompression effect on a fluid or on a mixture of fluids, resulting in cavitation effects and the generation of ultrafine bubbles. The cavitator comprises a fluid inlet, a fluid outlet, and a compression-decompression chamber situated between the inlet and outlet. The fluid is forced through the chamber under controlled pressure, causing hydrodynamic effects to generate the compression-decompression effect and ultrafine bubbles. This results in cavitation effects, which can be utilized for various applications, such as cleaning, mixing, or milling. The cavitator is designed to be compact, efficient, easy to use, requiring minimal maintenance, and offers a cost-effective solution for generating cavitation effects.

17 Claims, 11 Drawing Sheets

(58) Field of Classification Search
CPC ............ B01F 25/43141; B01F 25/4335; B01F
25/4338; B01F 25/53; C02F 1/34
USPC ......................................................... 261/76
See application file for complete search history.

(56) References Cited

U.S. PATENT DOCUMENTS

| | | | | |
|---|---|---|---|---|
| 8,894,273 B2 * | 11/2014 | Gordon | .................. | C10G 11/14 |
| | | | | 366/181.5 |
| 8,936,392 B2 * | 1/2015 | McGuire | .......... | B01F 25/43161 |
| | | | | 366/337 |
| 8,945,644 B2 * | 2/2015 | Gordon | .............. | B01F 25/4521 |
| | | | | 426/238 |
| 9,290,717 B1 * | 3/2016 | Kozyuk | ................... | C11B 3/16 |
| 2008/0029462 A1 * | 2/2008 | Huymann | ................. | C02F 1/34 |
| | | | | 210/764 |
| 2020/0055010 A1 * | 2/2020 | Gordon | ................ | B01F 25/451 |
| 2024/0140840 A1 * | 5/2024 | Hong | ..................... | B01F 25/53 |

* cited by examiner

FTLA Concentration / Size graph for Experiment:
AGPO2-T3 2023-03-21 13-36-19

Averaged FTLA Concentration / Size for Experiment:
AGPO2-T3 2023-03-21 13-36-19
Error bars indicate + / −1 standard error of the mean

Included Files

AGPO2-T3 2023-03-21 13-36-43
AGPO2-T3 2023-03-21 13-38-26
AGPO2-T3 2023-03-21 13-39-57

Details

| | |
|---|---|
| NTA Version: | NTA 3.4 Build 3.4.4 |
| Script Used: | SOP Standard Measurement 01-36-19PM 21~ |
| Time Captured: | 13:36:19 21/03/2023 |
| Operator: | test |
| Pre-treatment: | |
| Sample Name: | |
| Diluent: | 1 |
| Remarks: | |

Capture Settings

| | |
|---|---|
| Camera Type: | sCMOS |
| Laser Type: | Green |
| Camera Level: | 13 |
| Slider Shutter: | 1232 |
| Slider Gain: | 219 |
| FPS | 25.0 |
| Number of Frames: | 1498 |
| Temperature: | 23.1 - 23.2 °C |
| Viscosity: | (Water) 0.926 - 0.928 cP |
| Dilution factor: | Dilution not recorded |

Analysis Settings

| | |
|---|---|
| Detect Threshold | 3 |
| Blur Size: | Auto |
| Max Jump Distance | Auto: 11.4 -12.3 pix |

Results

122.9 nm
79.4 nm
55.7 nm
74.0 nm
106.4 nm
201.3 nm

Stats: Mean +/- Standard Error

| | |
|---|---|
| Mean: | 122.6 +/- 2.7 nm |
| Mode: | 80.9 +/- 3.2 nm |
| SD: | 55.6 +/- 2.2 nm |
| D10: | 74.6 +/- 2.6 nm |
| D50: | 104.8 +/- 5.6 nm |
| D90: | 201.0 +/- 4.9 nm |
| Concentration: | $6.00e+08$ +/- $6.58e+07$ particles/ml |
| | 32.8 +/- 3.6 particles/frame |
| | 43.5 +/- 4.2 centers/frame |

Fig. 11

ULTRAFINE-BUBBLE CAVITATOR

This application claims priority to U.S. provisional application 63/463,839, filed May 3, 2023 and to U.S. provisional application 63/460,997, filed Apr. 21, 2023. U.S. provisional applications 63/463,839 and 63/469,997, and all other extrinsic references contained herein are incorporated by reference in their entirety.

FIELD OF THE INVENTION

The field of the invention is fluid cavitation.

BACKGROUND

The background description includes information that may be useful in understanding the present invention. It is not an admission that any of the information provided herein is prior art or relevant to the presently claimed invention, or that any publication specifically or implicitly referenced is prior art.

Cavitation is a process in which vapor cavities or bubbles are formed in a fluid due to rapid changes in pressure. When these cavities collapse, they can generate localized high-pressure zones and produce numerous effects, including the generation of ultrafine bubbles. These bubbles can play a significant role in enhancing mass transfer, mixing, and chemical reactions in various industrial processes.

Conventional cavitation technologies, while pioneering, often encounter scalability constraints, diminished energy efficiency, and limited adaptability across various fluid types, including complex fluid mixtures. Moreover, these technologies typically struggle to consistently produce ultrafine bubbles, especially in the nanometer range, thereby limiting their application in fields requiring precise control over bubble size for enhanced process outcomes. To address these challenges and advance the field, a review of existing patents and published applications reveals innovations aiming to overcome these limitations:

U.S. Pat. No. 8,936,392B2 introduces an improved cavitation method enhancing energy efficiency and fluid treatment capabilities.

U.S. Pat. No. 6,502,979B1 focuses on a cavitation device designed for versatile fluid handling, indicating strides toward greater adaptability.

CN109824173B describes technology aimed at generating ultrafine bubbles more consistently, highlighting advancements in bubble size control.

US20080029462A1 and RU2472075C1 both contribute to the evolving landscape of cavitation technology, offering solutions to scalability and efficiency challenges.

These references collectively underscore the ongoing efforts to refine cavitation technology, making it more scalable, energy-efficient, and versatile. By incorporating these references, this document aims to align with the latest technological advancements, ensuring relevance and applicability to a broader range of industrial applications. In cases of definitional discrepancies between this document and the referenced patents, the definitions provided herein take precedence, ensuring clarity and consistency in terminology.

The development of a cavitation device that transcends existing limitations is paramount, specifically one capable of producing ultrafine bubbles with nanometer diameters, ensuring superior performance, heightened energy efficiency, and broad applicability. Such a device should not only excel in generating these minute bubbles but also boast case of integration into diverse systems, simplifying installation and maintenance processes. This innovation would cater to the growing demand for advanced cavitation solutions across various industries, offering a seamless upgrade path for enhancing operational efficiency and effectiveness. The envisioned device would represent a significant leap forward, addressing the critical need for a more adaptable, efficient, and user-friendly, and cheaper to manufacture technology in the realm of fluid dynamics and processing.

The present invention seeks to fulfill these needs and provide further related advantages by introducing a novel cavitation device with a unique design that enables the efficient generation of cavitation effects and ultrafine bubbles. The invention's adaptable design allows it to be incorporated into diverse types of pipes and constructed from varied materials, ensuring compatibility with a diverse range of applications and fluid types.

Cavitation has a wide range of potential applications, including cleaning, mixing, and milling. It can also be used for various industrial processes, such as water treatment, oil and gas production, and pharmaceutical manufacturing. The ability to generate cavitation effects through a compact, efficient, and easy-to-use device offers significant benefits over traditional methods. By utilizing hydrodynamic influences to create compression-decompression conditions, the cavitator can effectively generate further cavitation effects and ultrafine bubbles, providing a valuable tool for various industries and applications.

Cavitation has a variety of industrial uses, including:

1) Water Treatment Enhancement: Utilizing the dynamic forces of hydrodynamic cavitation, wastewater can be transformed, elevating the quality to meet drinking water standards. This robust process can adeptly eradicate pollutants, disintegrate organic compounds, and act as a sterilizing agent, ensuring safer water for communities.

2) Oil and Gas Production Optimization: The application of cavitation in the oil and gas sector is a game-changer, bolstering the extraction processes to new levels of efficiency. By inducing controlled, high-energy cavitation in fluids, the technique can significantly amplify the recovery rates of these valuable resources.

3) Pharmaceutical Manufacturing Innovations: In the realm of pharmaceuticals, hydrodynamic cavitation offers versatile solutions ranging from the precision of drug delivery mechanisms to the enhancement of dispersion and mixing techniques, paving the way for more efficient manufacturing processes and higher-quality medicinal products.

4) Food and Beverage Quality Advancements: The infusion of cavitation technology in food and beverage processing goes beyond conventional methods, enhancing the textural and flavor profiles of products like juices, sauces, and soups. It's a fine-tuning process that elevates taste and consistency, ensuring consumer satisfaction.

5) Agitation and Mixing Precision: Hydrodynamic cavitation shines in its ability to merge liquids with remarkable efficiency. Its prowess extends to optimizing heat transfer and accelerating chemical reactions, making it an indispensable tool in various industrial mixing and agitation applications.

6) Surface Cleaning Efficacy: Cavitation is a powerhouse in surface cleaning, capable of stripping away contaminants, corrosion, and stubborn deposits. This method is especially effective where precision and preservation of the underlying material are paramount.

7) Milling and Grinding Refinement: The force of hydrodynamic cavitation can be harnessed to pulverize solid materials into fine powders. Its application spans a variety of materials, including minerals, metals, and ceramics, facilitating processes that require a high degree of material fineness.

8) Biogas Production Efficiency: Cavitation technologies are at the forefront of renewable energy, specifically in the optimization of biogas production. By enhancing the breakdown of organic matter, these technologies contribute significantly to sustainable energy efforts, turning waste into valuable resources.

9) Mining: Hydrodynamic cavitation can be employed to enhance mineral extraction processes. It can facilitate the separation of valuable minerals from ores by generating micro-turbulences that increase the efficiency of froth flotation. This process also helps in reducing the use of harmful chemicals that are traditionally used in ore processing, thus promoting a cleaner extraction method.

10) Waste Water Treatment: In wastewater management, cavitation serves as an advanced treatment technique. It can disrupt and disintegrate organic compounds, leading to more effective purification of industrial effluents. This method can also be engineered to target specific contaminants, like heavy metals, resulting in water that is safe for release or reuse, aligning with stringent environmental standards.

11) Environmental Remediation: For environmental remediation, hydrodynamic cavitation can be a powerful tool in cleaning up polluted water bodies. By inducing oxidation, it can break down pollutants such as petroleum hydrocarbons or industrial dyes in water, making it an innovative solution for restoring contaminated environments.

12) Biofuels Production: In the production of biofuels, cavitation can accelerate the breakdown of biomass into fermentable sugars, enhancing the efficiency of bioethanol production. It can also be utilized in the transesterification process for biodiesel production, improving yield while reducing energy consumption and reaction time.

13) These are just a few of the many industrial uses of hydrodynamic cavitation.

Thus, there is still a need for the ability to generate cavitation effects through a compact, efficient, and easy-to-use device that can significantly improve upon these processes and offer outstanding benefits to various industries.

SUMMARY OF THE INVENTION

The inventive subject matter provides apparatus, systems and methods in which a cavitator passes a fluid serially through (a) first and second successively smaller (converging) compression-decompression stages and (b) first and second successively larger (diverging) decompression-compression stages.

According to embodiments of the inventive subject matter, the compression-decompression stages can comprise a compression surface and an adjacent decompression surface, wherein each individual compression-decompression stage serves to narrow the cross-sectional area available for a fluid to flow.

The decompression-compression stages can also comprise a compression surface and an adjacent decompression surface, wherein each individual decompression-compression stage serves to widen the cross-sectional area available for a fluid to flow.

Cross-sections of the passageways in the various stages can have any suitable shape, including cylindrical, triangular, circular, and triangular with at least one rounded side. Cross-sections of the compression-decompression stages are preferably hexagonal, or starshaped with at least 4 rays, and more preferably with at least 8 rays.

Preferred apparatus have one or more of: (a) hard angles are preferably present between successive compression and decompression surfaces; (b) throat regions between the converging and the diverging stages of a compression-decompression stage with cross-sectional areas of inlets and/or outlets 4-10 times the area of the throat; and (c) multiple throats.

In some embodiments the different compression-decompression stages can be twisted clockwise and/or counterclockwise by an angle of 3 to 45 degrees.

Cavitators can be configured to be installed in series within a system.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

BRIEF DESCRIPTION OF THE DRAWING

FIG. 11 is a graph of 3rd party results that displays detailed metadata and analysis results from a NanoSight system, listing technical parameters such as camera type, laser type, and temperature, alongside measurement results for particle size distribution in a sample of water that was treated with the cavitator.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present invention provides a cavitation device designed to generate ultrafine bubbles with a diameter mean of less than 150 nanometers, using a pathway configured with successive compression-decompression stages (both converging and diverging) and strategically placed hard angles to produce shearing effects. This invention improves upon prior efforts in part due to the simplistic design and proficiency with which it can be built, as it consists of a single piece with no moving parts.

The fluid or mixture of fluids to be passed by the cavitator have to be delivered to the cavitator's inlet at a pressure of at least 15 PSI, with preference of running the fluids at a pressure between 30-120 PSI and 120-250 PSI to achieve optimal results and depending on the application.

Figure 1:
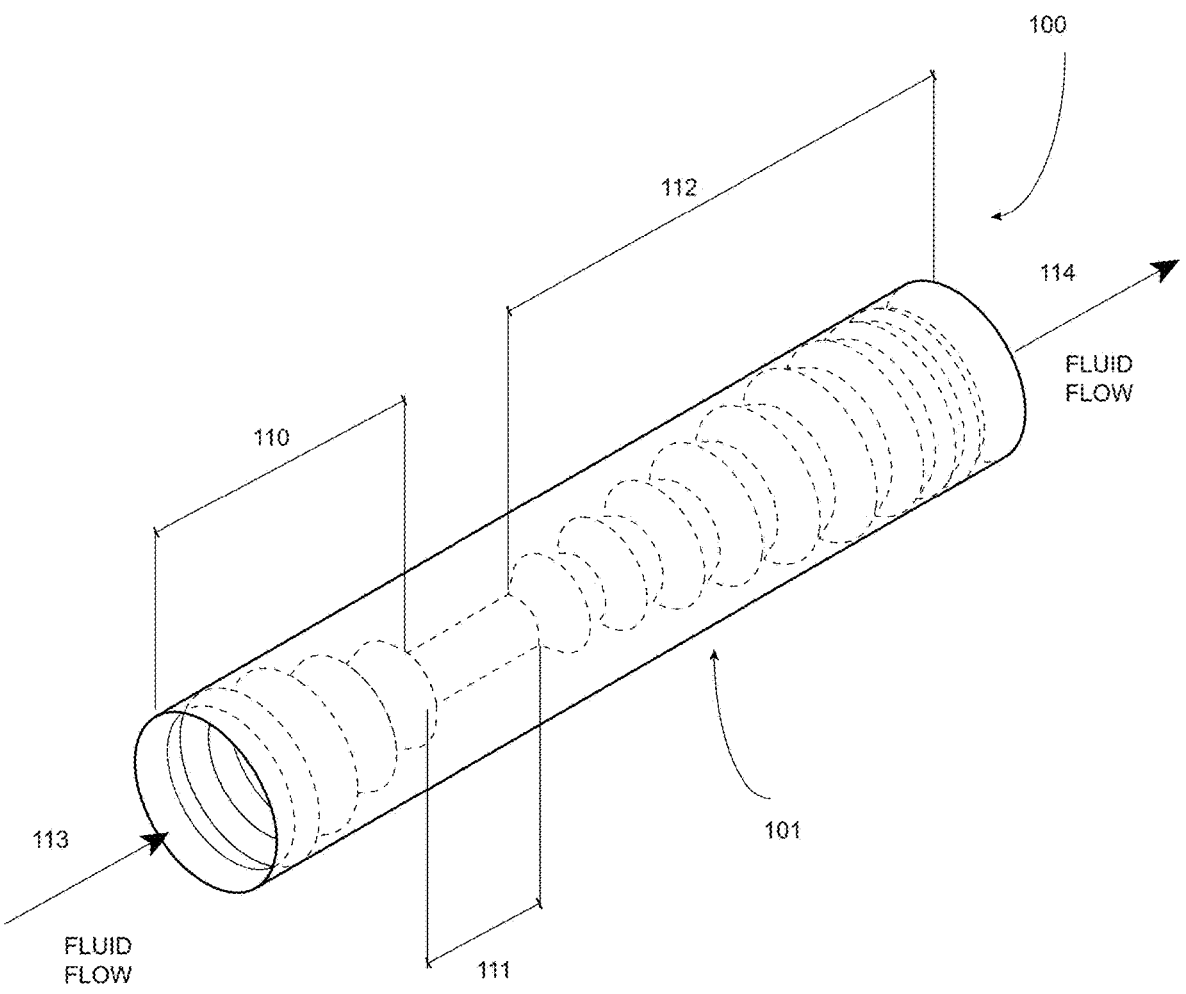
FIG. 1 illustrates a 3-dimensional apparatus for treating a fluid, according to embodiments of the inventive subject matter.

FIG. 1 shows a perspective view of cavitation device 100, according to embodiments of the inventive subject matter.

As will be described in further detail below, the cavitator 100 can be installed within a pipe or other fluid system. In FIG. 1, the cavitation device 100 of the inventive subject matter is shown within an example pipe 101, and is illustrated in broken lines to illustrate how it is disposed within the pipe 101.

As seen in FIG. 1, the cavitation device 100 includes an inlet 113 for receiving the fluid and an outlet 114 for discharging the processed fluid. As will be described in further detail below, the cavitation device 100 includes a cylindrical flow channel or pathway dimensioned and shaped to guide the fluid through the cavitation device of length L from the inlet 113 to the outlet 114.

The cavitation device 100 includes a converging section 110 that comprises a series of converging compression-decompression stages located within the pathway. Each stage narrows the flow channel, resulting in an increase in fluid velocity and a decrease in fluid pressure. These compression-decompression stages are critically designed with carefully chosen compression ratios to optimize the generation of ultrafine bubbles. For example, these ratios may range from approximately 1.1 to approximately 5.0, with specific stages tailored to achieve a desired bubble size distribution and improve cavitation efficiency.

The cavitation device 100 further includes a throat section 111 of a predetermined size, positioned at the end of the converging compression-decompression stages. The throat section 111 serves as a transitional point between the converging and diverging sections of the pathway of cavitation device 100, where the fluid undergoes the maximum velocity and minimum pressure.

A series of diverging decompression-compression stages 112 located within the pathway, following the throat section 111. These stages 112 progressively widen the flow channel, causing the fluid velocity to decrease and the fluid pressure to increase. As with the converging stages, the compression-decompression ratios of the diverging stages are tuned to optimize the generation of ultrafine bubbles. As can be seen in FIG. 1, the sections 110, 111, 112 of the cavitator 100 have circular/cylindrical cross-sections.

Figure 2:
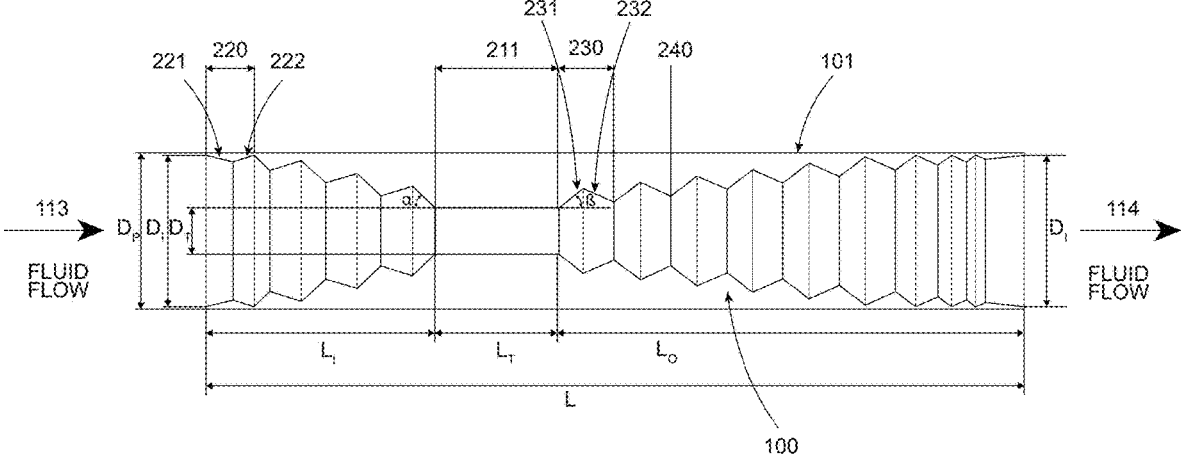
FIG. 2 is a 3-dimensional cross-sectional view of the cavitator illustrated in FIG. 1.

In FIG. 2 is shown a cross-sectional side view of the cavitator 100 of FIG. 1, illustrating the compression-decompression stages of converging section 110 and decompression-compression stages of diverging section 112. Each of the compression decompression stage 110 includes a compression surface and decompression surface. For example, FIG. 2 shows the first compression-decompression stage 220 within the converging section 110. The first compression-decompression stage 220 includes a compression surface 221 and a decompression surface 222. As is visible in FIG. 2, each of the stages converges toward the center of the cavitator 100 such that after each stage the flow channel is more narrow.

FIG. 2 also shows throat 211 (which is the throat section 111 of FIG. 1) following the converging section 110 and the diverging section 112 following the throat section 111/211. Within the diverging section 112, each of the decompression-compression stages includes a decompression surface and a subsequent compression surface. In FIG. 2, the first decompression-compression stage 230 is labeled having a decompression surface 231 and compression surface 232. As is visible in FIG. 2, each of the decompression-compression stages of the diverging section 112 diverges away from the center of pathway of the cavitator 110, such that the flow channel is broader after each stage.

FIG. 2 also shows hard angles 240 positioned between each of the compression and decompression surfaces, both in the converging and diverging sections of the pathway. These hard angles 240 create shearing effects on the fluid as it flows through the pathway, contributing to the formation of ultrafine bubbles and the cavitation effects. The shearing caused by hard angles 240 also helps to break down the molecules of other substances that could be in the water flow. The cavitation device 100 can be constructed from various materials (e.g., metals, plastics, etc.), depending on the specific application, and can be adapted to fit within different types of pipes and fluid systems.

Within the cavitator 100, there's an opening or outer diameter $D_P$ that is smaller than the inner diameter of the piping where the cavitator 100 is installed. Typically, the outer diameter DP is 1 mm less than the inner diameter of the piping where unit is installed, but other tolerances are contemplated. $D_I$ is the inner diameter of the flow passageway at its widest point. In this example, $D_I \leq 0.99\ D_P$. $D_T$ is the inner diameter of the throat section 111.

Each of the compression surfaces in the cavitator 100 has a taper angle $\alpha$ from horizontal, and each of the decompression surfaces in cavitator 100 has a taper angle $\beta$ from horizontal. In embodiments of the inventive subject matter, the taper angles $\alpha$ and $\beta$ range between 12°-75°. In other embodiments of the inventive subject matter, the taper angles $\alpha$ and $\beta$ range between 15°-60° from the horizontal line.

In FIG. 2, length of the compression-decompression stage 110 is denoted $L_I$, the length of the throat section 111 is designated $L_T$ and the length of the decompression-compression stage 112 is designated $L_o$.

The ratio between $D_I/D_T$ preferably ranges from 4 to 7. The ratio between $L_T/D_T$ preferably ranges from 2 to 4. The ratio between $L_I/L_T$ preferably ranges from 1.5 to 4. The ratio between $L_o/L_T$ preferably ranges from 3 to 7.

As seen in FIGS. 1 and 2, each of the successively smaller compression-decompression stages in the converging section 110 have successively narrower internal cross-sectional areas. Likewise, each of the successively smaller decompression-compression stages of the diverging section 112 have successively larger internal cross-sectional areas.

This configuration is engineered to facilitate the precise manipulation of fluid dynamics within the device, enabling the optimization of cavitation processes. The gradual increase and decrease in cross-sectional areas are strategic, designed to intensify the cavitation effect by modulating fluid velocity and pressure. This meticulous arrangement aims to maximize the efficiency of bubble formation and collapse, thus enhancing the cavitator's overall performance in fluid treatment applications.

At each compression surface, the pressure of the gas-liquid mixture passing through increases. This increases solubility of the gas in the liquid. Then, as the liquid passes to a decompression surface, the corresponding decrease in pressure decreases solubility. When this happens, the gas drops out of the solution, forming bubbles Thus, the converging section 110 results in a net increase in solubility of the liquid. The throat section 111 then stabilizes the pressure at higher pressures, and the diverging section 112 results in a greater formation of bubbles In preferred embodiments of the inventive subject matter, the diverging section 112 is longer than the converging section 110. This is visible in the illustration of FIG. 2.

In embodiments of the inventive subject matter, the throat section 111/211 has a length that is between 2-4 times its internal cross-sectional diameter. This way, the length of the throat 111/211 is sufficiently long to ensure sufficient compression.

It should be appreciated that it is contemplated that a plurality of cavitators 100 can be arranged in series such that the diverging section 112 of one cavitator 100 feeds into the converging section 110 of the next cavitator 100 in the series.

Figure 3:
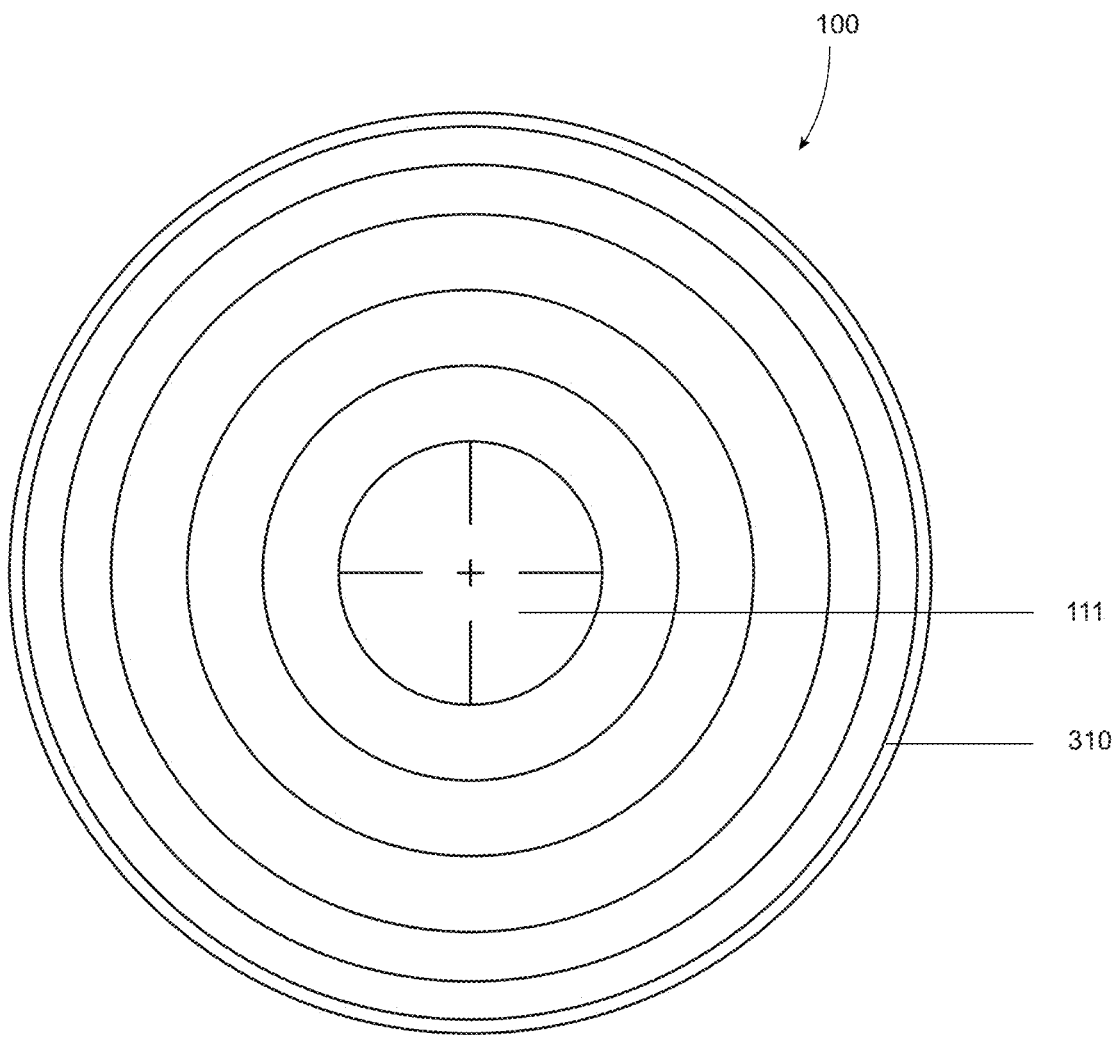
FIG. 3 is a 3-dimensional frontal view of the cavitator illustrated in FIG. 1.

FIG. 3 depicts a frontal view of the cavitator showing the diameters of the throat 111 and of the external diameter 310 of the cavitator 100. The external diameter 310 corresponds to the diameter $D_P$ of FIG. 2. The compression-decompression ratios of the converging and diverging sections, as well as the size of the throat and the configuration of the hard angles generate an effect that produces ultrafine bubbles with a diameter mean of less than 150 nanometers.

Figure 4:
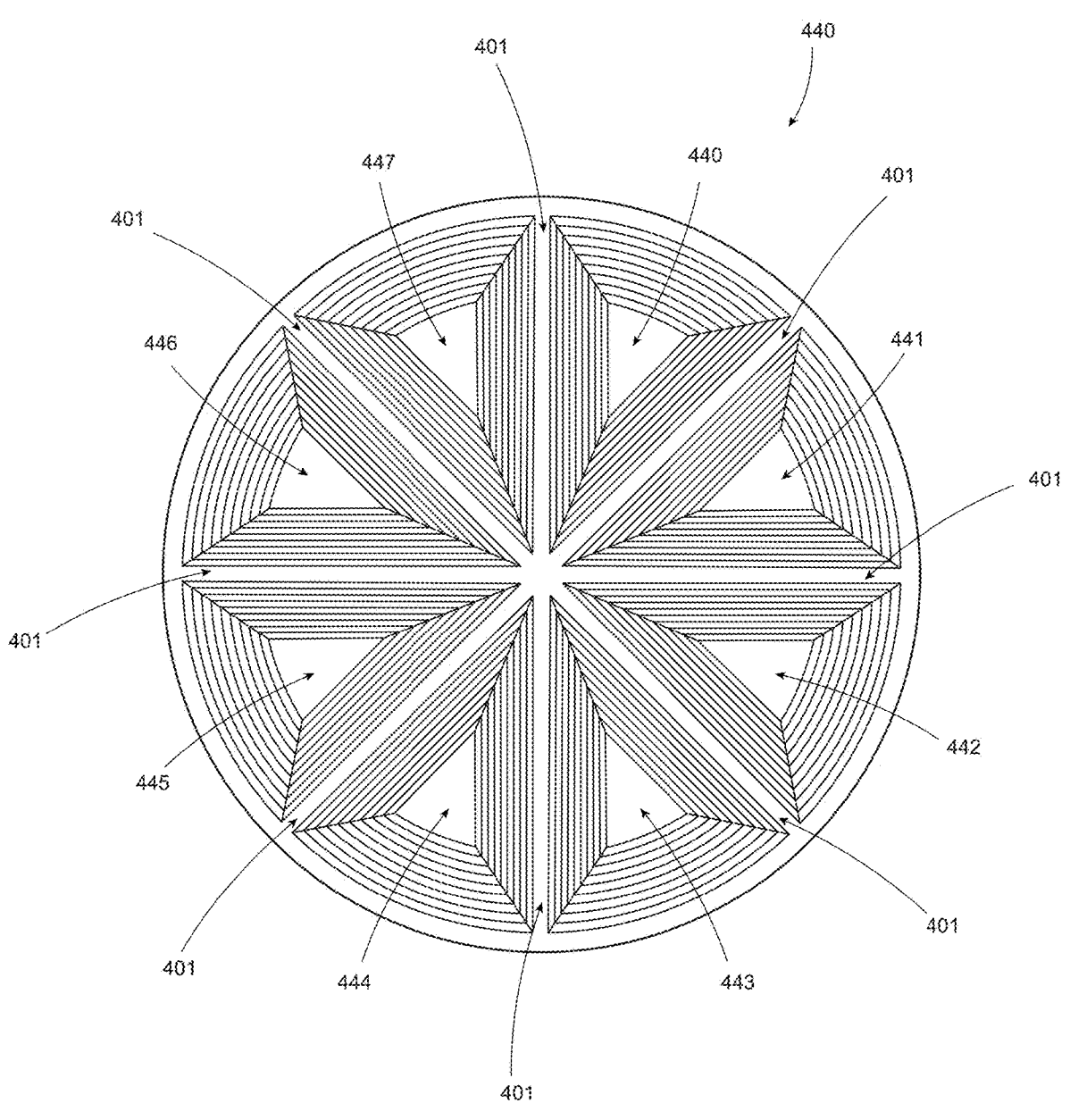
FIG. 4 is a 3-dimensional frontal view of a cavitator of another embodiment of the inventive subject matter.
Figure 5:
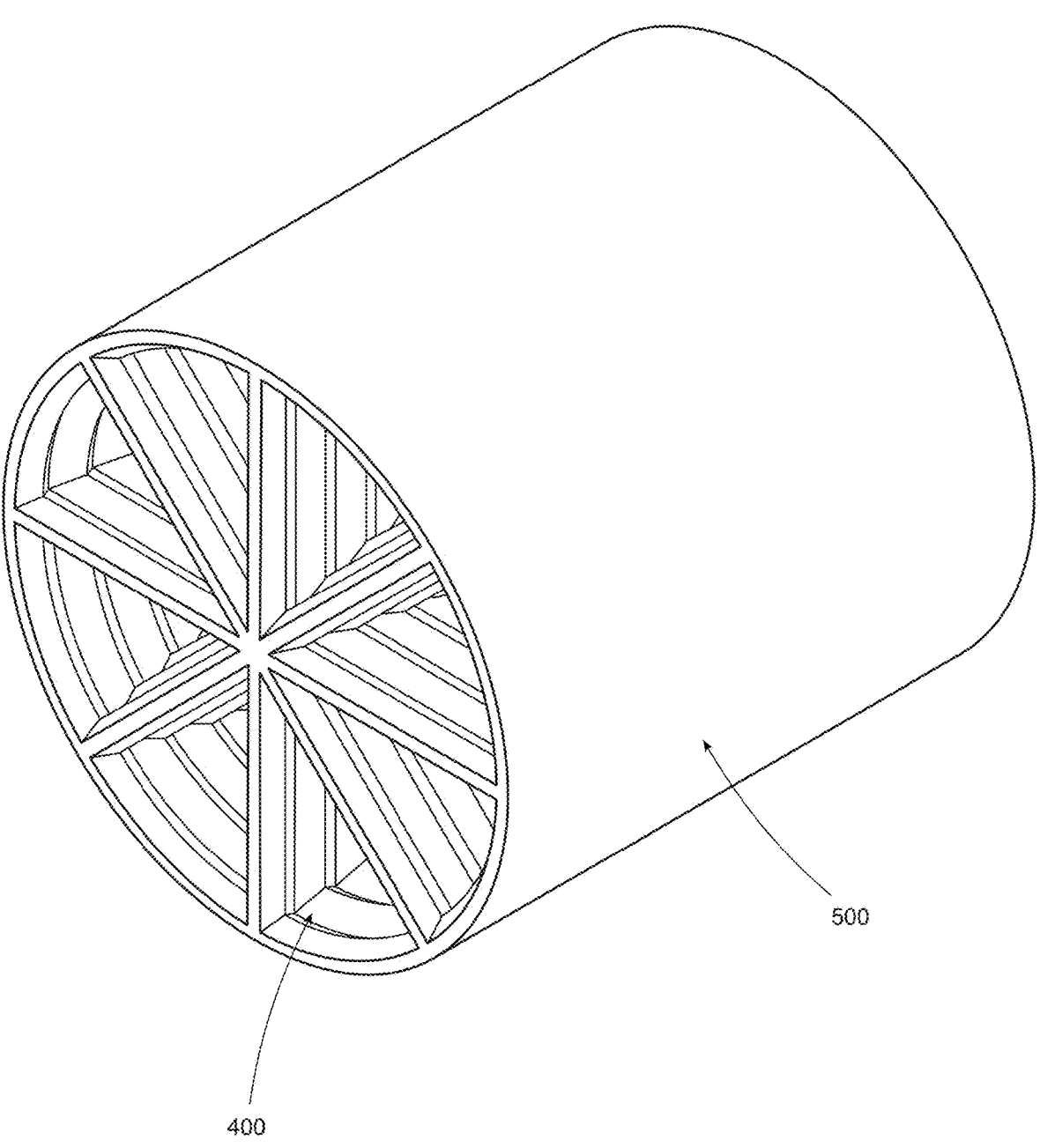
FIG. 5 is a 3-dimensional perspective view of the cavitator of FIG. 4.
Figure 6:
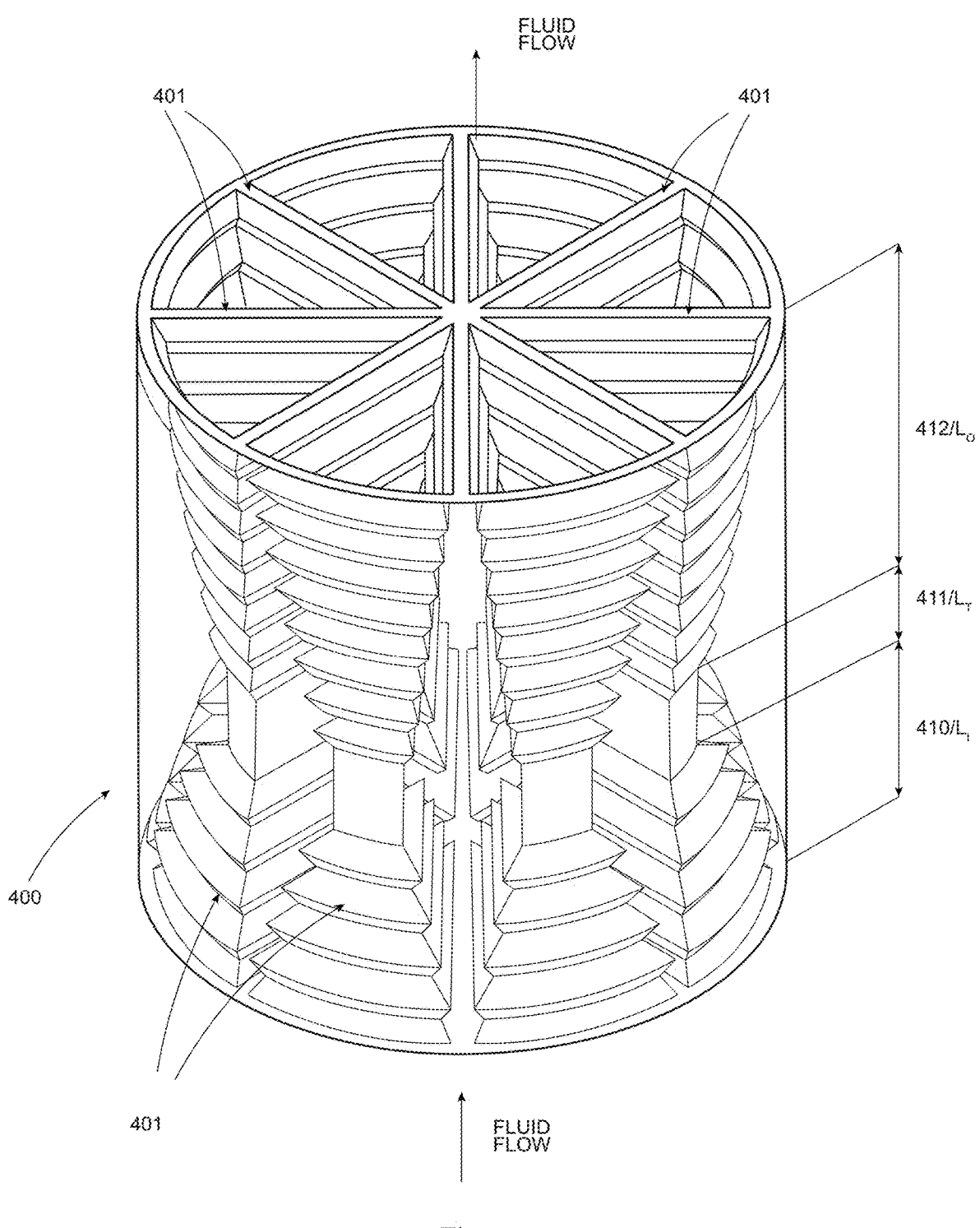
FIG. 6 is an isometric view of the cavitator of FIGS. 4-5.

FIGS. 4-5-6 illustrate a cavitator 400, according to embodiments of the inventive subject matter. The cavitator device 400 is a variant of the cavitator 100 of FIGS. 1-3. The cavitator 400 has a different form factor from cavitator 100, achieving the same operational outcomes in a more compact footprint. This design innovation further enables easier integration into existing systems where space is at a premium, without compromising the efficiency and effectiveness of the cavitator.

FIG. 4 shows an end view of the cavitator 400, with FIG. 5 showing a perspective view of the cavitator 400 installed within a pipe 501. FIG. 6 shows a perspective view of the cavitator 400 without the pipe 501, such that the sections of the cavitator 400 are visible.

As with the cavitator 100 of FIGS. 1-3, the cavitator 400 also includes a converging section 410 (of a length $L_o$) made up of a series of compression-decompression stages, a throat 411 (of a length $L_T$), and a diverging section 412 (of a length $L_f$) made up of a series of decompression-compression stages (seen in FIG. 6).

As seen in the end view of FIG. 4, the cavitator 400 includes a plurality of spokes 401 that define sectors 440, 441, 442, 443, 444, 445, 446, and 447 of the cross-section of the cavitator 400. The spokes 401 each include the same compression-decompression stages (for the converging section) and decompression-compression stages (for the diverging section) as the inner diameter of cavitator 400 and cavitator 100, and as such similarly contribute to the desired effect on the fluid passing through the flow channel of the cavitator 400.

The relationship/ratios of the compression surfaces and decompression surfaces in the converging section 410 to achieve the converging effect and the relationship/ratios of the decompression surfaces and compression surfaces in the diverging section 412 can be the same as those respective sections 110, 112 of FIGS. 1-3. Likewise, the taper angles of the compression surfaces relative to horizontal and of the decompression surfaces relative to horizontal can be the same as the respective taper angles α and β of FIGS. 1-3. The hard angles between the stages can also be the same as the hard angles used in FIGS. 1-3.

The diameters and ratios discussed above with regard to FIGS. 1-3 can be considered to similarly apply to the embodiment of FIGS. 4-6.

The sectors 440, 441, 442, 443, 444, 445, 446, and 447 maintain consistent ratios of compression-decompression (in the converging section), crucial for its performance. This is achieved through the precise engineering of its internal components, which allows for a significant reduction in size while ensuring the delivery of consistent and reliable results. The compact design not only simplifies installation and maintenance but also reduces the overall cost of system integration, making it a more accessible solution for a wider range of applications.

The spokes 401 introduce additional surface area to affect the flow of water flowing through the cavitation device 400. This results in an increased effect in the same amount of length as the device 100. Alternatively, this also means that the same effect can be achieved with a shorter length in device 400.

Figure 7:
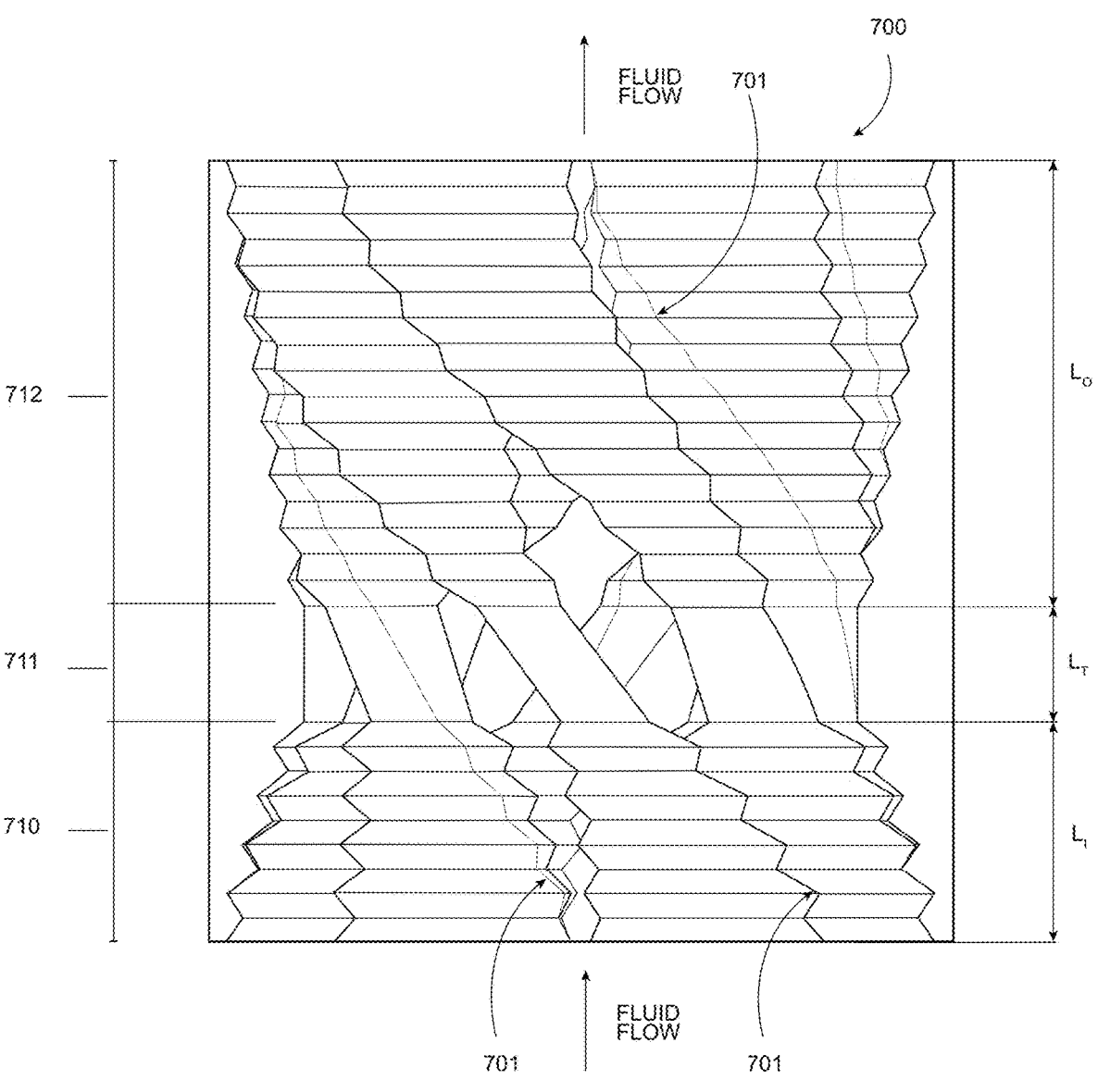
FIG. 7 is a lateral isometric view of a cavitator, according another embodiment of the inventive subject matter.
Figure 8:
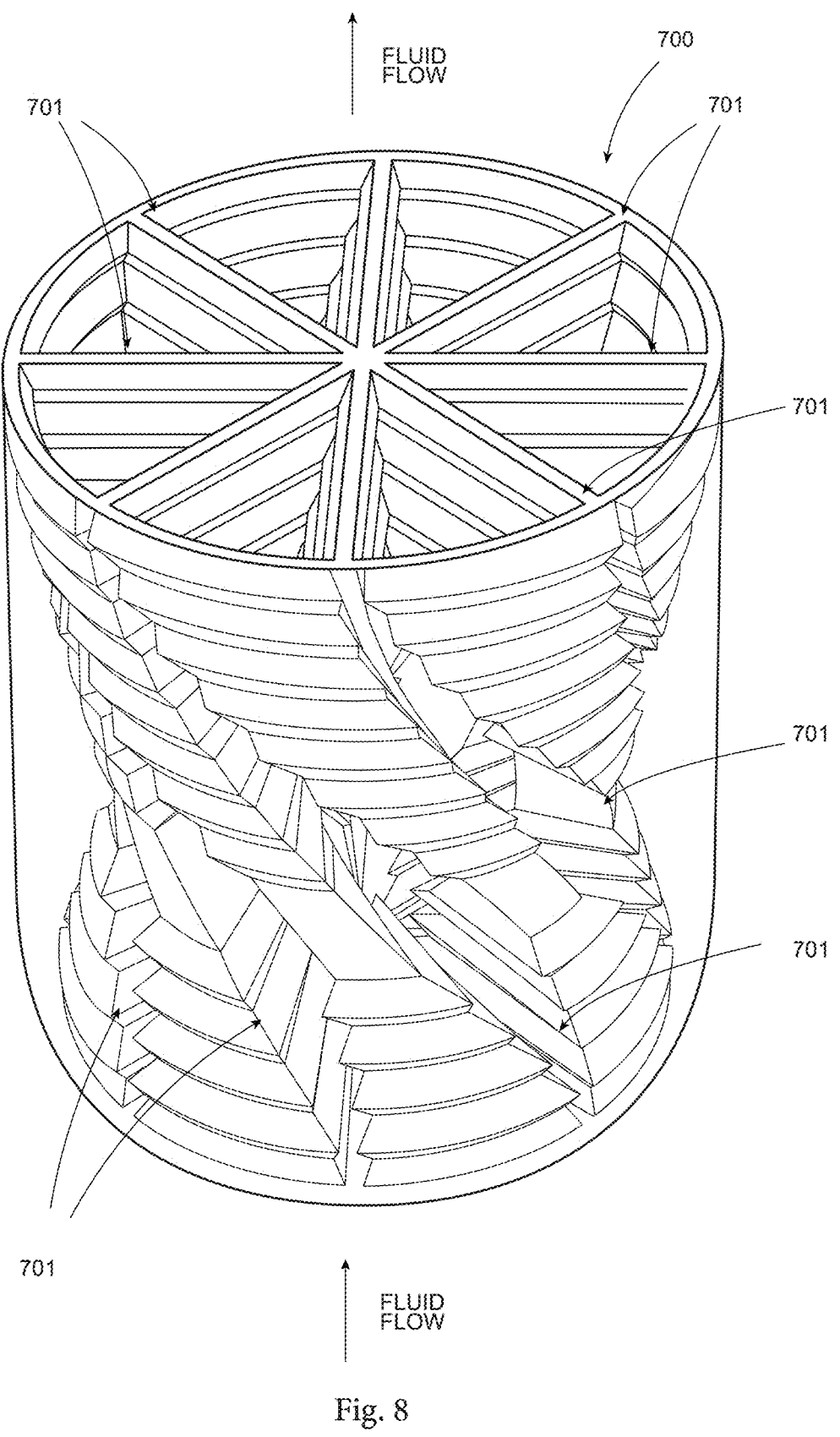
FIG. 8 is an isometric view of the cavitator FIG. 7.

FIGS. 7-8 illustrate another version of the cavitator, according to embodiments of the inventive subject matter. The cavitator 700 of FIGS. 7-8 is uniquely engineered to include a twist between its compression-decompression stages and decompression-compression stages. This innovative design facilitates the generation of a vortical movement in the fluid or fluid mixture, enhancing the cavitation effect at the outlet and introducing a greater mixing effect. This vortical movement significantly improves the mixing and homogenization of the fluid, resulting in more uniform and effective cavitation. The capability for both counterclockwise and clockwise rotation of the stages offers unparalleled flexibility, allowing for the adjustment of the cavitation effect according to specific application requirements. Furthermore, assembling a series of these cavitators, with either synchronized or alternating rotational directions, creates a multi-stage system. This multi-stage arrangement amplifies the cavitation effect, making it suitable for more demanding applications where higher levels of fluid treatment are necessary. In practice, this embodiment of the inventive subject matter can be used for fluids having chemicals that need to be mixed, such as chlorine used for a pool.

To achieve the twist, the cavitator 700 includes a plurality of spokes 701. As the spokes 701 travel from the inlet side (bottom of FIGS. 7-8) towards the throat 711 and then towards the outlet side (top of FIGS. 7-8), they twist, creating twisting channels or sectors within the cavitator 700.

The spokes 701 each include the same compression-decompression stages (for the converging section) and decompression-compression stages (for the diverging section) as the inner diameter of cavitator 700 and cavitator 100, and as such similarly contribute to the desired effect on the fluid passing through the flow channel of the cavitator 700.

The relationship/ratios of the compression surfaces and decompression surfaces in the converging section 710 to achieve the converging effect and the relationship/ratios of the decompression surfaces and compression surfaces in the diverging section 712 can be the same as those respective sections 110, 112 of FIGS. 1-3. Likewise, the taper angles of the compression surfaces relative to horizontal and of the decompression surfaces relative to horizontal can be the same as the respective taper angles α and β of FIGS. 1-3. The hard angles between the stages can also be the same as the hard angles used in FIGS. 1-3.

The diameters and ratios discussed above with regard to FIGS. 1-3 can be considered to similarly apply to the embodiment of FIGS. 7-8.

Figure 9:
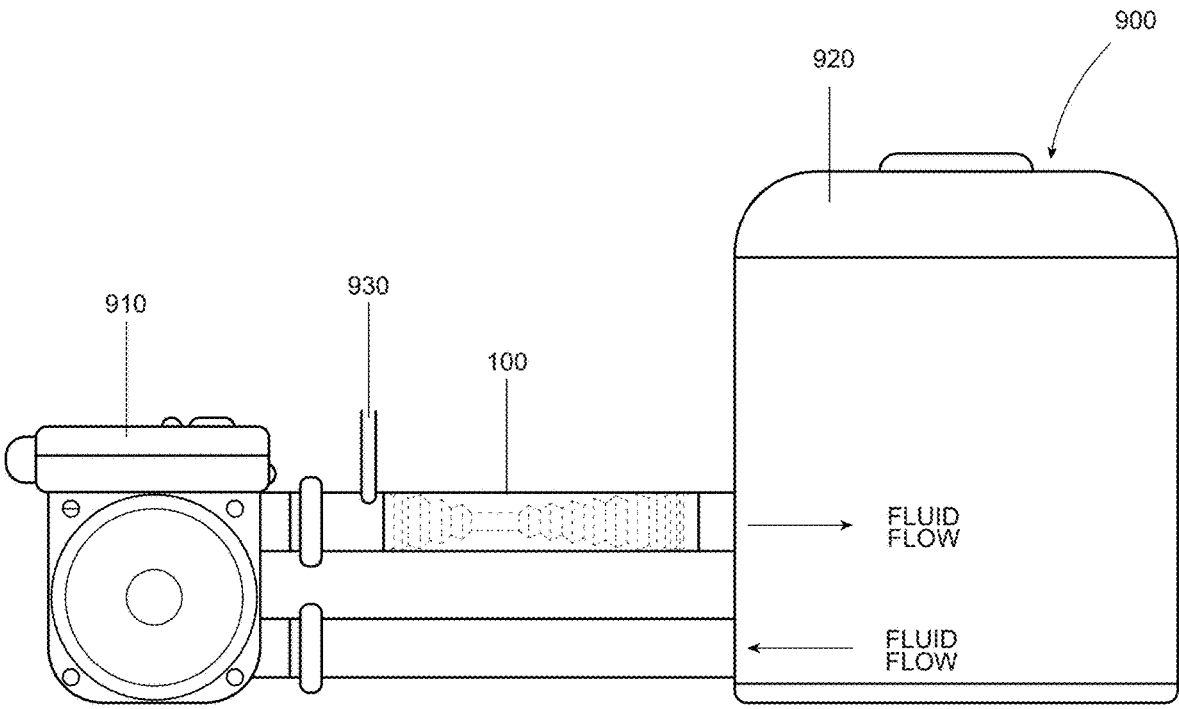
FIG. 9 illustrates a streamlined hydrodynamic cavitation system, where a cavitator is strategically positioned inline following a pump and preceding a reservoir, designed for efficient fluid processing.

FIG. 9 depicts a cavitation system 900 as a water treatment solution designed for adaptability across various applications, ranging from agricultural irrigation to industrial processes. At the heart of this system is a cavitator. In this example, the cavitator is considered to be the cavitator 100, but the cavitators 400 and 700 are also suitable for the system 900 . . . . The cavitator 100 is a crucial component that utilizes hydrodynamic cavitation to generate ultrafine bubbles in the water as discussed above. This process involves the formation and subsequent collapse of vapor-filled cavities in a liquid, which creates shockwaves that produce nanoscopic bubbles. These ultrafine bubbles have unique properties, including high stability and a large surface area-to-volume ratio, which significantly enhance the water's oxygenation and nutrient delivery capabilities when used in agricultural settings.

The pump 910 is responsible for maintaining the appropriate water flow through the system. It ensures that the water passes through the cavitator 100 at a controlled rate, facilitating the consistent generation of ultrafine bubbles. This consistent flow is critical for maintaining the efficiency and effectiveness of the water treatment process. The tank 920 serves as a reservoir for the treated water. In this tank 920, the water enriched with ultrafine bubbles can be temporarily stored, allowing for a sustained release of the bubbles into the irrigation systems or other application points. The tank's capacity is aligned with the output of the cavitator 100 and pump 910, ensuring a balanced and optimized system.

The gas injection line 930, is a versatile feature that, depending on the specific application, can be utilized to inject various gases such as oxygen, ozone, carbon dioxide, or hydrogen into the water. The choice of gas is determined by the desired outcome, whether it's to maximize plant growth, control pH levels, or treat wastewater. For applications where gas infusion is not required, this line can be bypassed, showcasing the system's flexibility.

Each component is engineered to work in harmony, offering a modular and scalable water treatment solution. Whether it's for an agricultural operation seeking to improve crop yields and reduce water usage or an industrial facility aiming to enhance wastewater treatment, the system 900 provides a tailored approach to water management challenges.

Figures 10A, 10B:
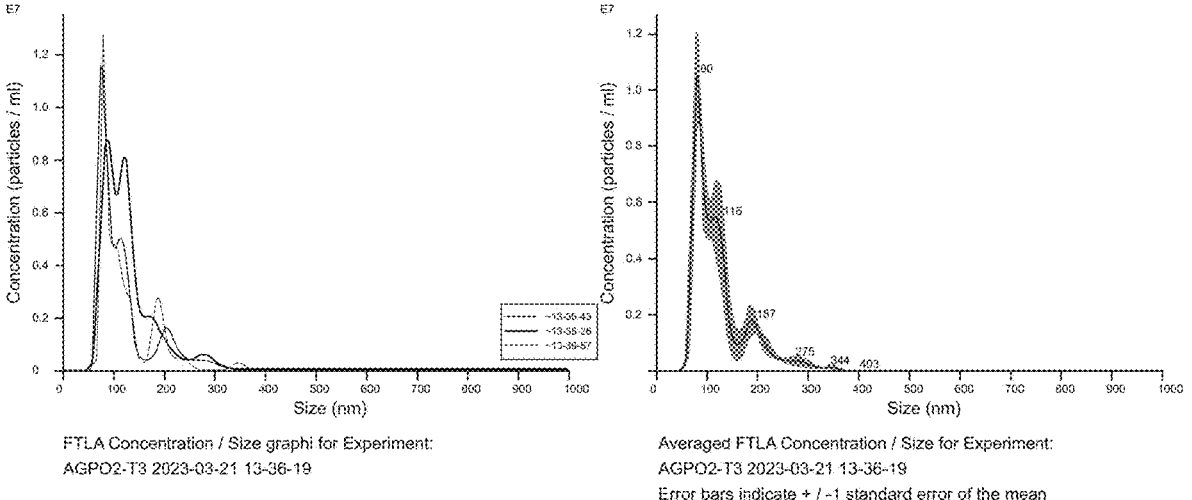
FIGS. 10A-10B are graphs of 3rd party results that displays two graphs from a NanoSight analysis showing particle size distribution.

FIGS. 10A and 10B present two NanoSight analytical graphs depicting the size distribution of ultrafine bubbles. The graph of FIG. 10A shows a broader size range while the graph of FIG. 10B provides a detailed view with a clear peak, indicating a more precise measurement of bubble sizes within the sample.

FIG. 11 details the metadata of a NanoSight analysis, indicating the camera and analysis settings used for measuring ultrafine bubbles, including camera type, laser specifications, and detection thresholds. The analysis results list mean bubble sizes, modal values, and concentration, providing essential data for understanding the characteristics of the sample tested that has been treated by the cavitator 100.

It is noted that the devices in the embodiments discussed herein can be constructed as an insert for an existing pipe. The device can be introduced into the existing pipe without having to replace the pipe itself within a water network.

The present invention's distinctively engineered pathway, featuring meticulously designed compression-decompression stages and hard angles ranging between 10-80 degrees, or 90-150 degrees, elevates it to a state-of-the-art cavitation device. This advanced design is pivotal in ensuring high-efficiency generation of ultrafine bubbles and robust cavitation effects, adaptable to a wide variety of fluids and fluid mixtures. The strategic placement and orientation of the stages, combined with the precise angulation, play a crucial role in optimizing the cavitation process. By adjusting these angles, it is possible to tailor the cavitation and shearing intensity and effects, thereby aiding in the control of bubble size and distribution. Such adjustability facilitates the collapse of vapor cavities more effectively and the sequencing of stages is arranged to successively escalate the cavitation intensity. By creating intense localized pressure variations and fluid dynamics, these features significantly enhance the cavitation's intensity and uniformity, leading to more effective fluid treatment and bubble generation, surpassing the capabilities of traditional cavitation technologies. Furthermore, the design's adaptability ensures its suitability for a broad range of applications, from water treatment to chemical processing, providing a versatile solution that can be customized to meet diverse operational requirements.

Use Case: Enhancing Greenhouse Operations with Oxygen-Enriched Water via Hydrodynamic Cavitation.

Background: Greenhouse operators constantly seek innovative solutions to enhance plant growth, increase yields, and ensure the health of their crops in a sustainable and efficient manner. Water quality and oxygenation play crucial roles in optimizing plant health, root development, and nutrient uptake.

Innovation: The introduction of a cavitator using hydrodynamic cavitation for injecting oxygen gas into the irrigation water represents a significant advancement for greenhouse operations. This technology utilizes the principles of hydrodynamic cavitation to dissolve oxygen more efficiently into water, creating an oxygen-rich environment that promotes healthier and more robust plant growth.

Application: A mid-sized greenhouse operator, specializing in hydroponic vegetable production, integrates the cavitator system into their existing water irrigation setup. By injecting oxygen directly into the irrigation lines, the technology significantly enhances the dissolved oxygen levels in the water fed to the plants. This oxygen-enriched water improves root respiration, leading to better nutrient absorption and healthier plant growth. Additionally, the increased oxygen levels in the water help maintain the health and balance of the ecosystem within the greenhouse ponds, preventing the growth of anaerobic bacteria and pathogens that could harm the crops.

Significance:

Improved Crop Growth and Yield: The oxygen-rich water enhances plant growth, leading to an increase in crop yield and quality. This benefit is particularly valuable for high-value crops where quality directly impacts market price.

Sustainability and Environmental Benefits: This method of oxygen injection is more energy-efficient than traditional aeration techniques and does not require the use of chemicals to maintain water quality, aligning with sustainable agriculture practices.

Cost Efficiency: By improving water quality and plant health, the greenhouse operator experiences reduced losses due to disease and can achieve higher yields with the same amount of water and nutrients, improving the overall efficiency of the operation.

Enhanced Water Ecosystem Health: The technology ensures that the water in the ponds remains oxygenated and healthy, reducing the need for water changes and minimizing the environmental impact of the greenhouse operation.

This use case demonstrates the practical application and benefits of using a cavitator with hydrodynamic cavitation for oxygen injection in greenhouse operations. It highlights how innovative clean technology can contribute to sustainable agriculture, enhancing both crop growth and environmental sustainability.

Use Case: Sustainable Water Treatment and Purification.

Background: In many industries, especially within the pharmaceutical, chemical manufacturing, and food and beverage sectors, water purity is critical not only for product quality but also for ensuring environmental compliance. Traditional water treatment methods often involve extensive use of chemicals, energy-intensive processes, and generate secondary pollutants that can be challenging to manage.

Innovation: The cavitator utilizing hydrodynamic cavitation offers a groundbreaking approach to water treatment and purification. This technology harnesses the power of cavitation, a process where rapid changes in pressure create vapor bubbles in a liquid. When these bubbles collapse, they generate powerful shockwaves and extreme temperatures locally, which can break down contaminants, including organic compounds, bacteria, and even microplastics, without the need for harmful chemicals or high energy inputs.

Application: A pharmaceutical company facing stringent regulatory requirements for wastewater treatment adopts the cavitator technology. By integrating the cavitator into their existing wastewater treatment plant, they are able to significantly enhance the breakdown of complex organic molecules and pathogens, ensuring that the effluent water meets or exceeds environmental standards. This application not only helps in achieving compliance with minimal environmental impact but also reduces operational costs by lowering energy consumption and chemical usage.

Significance:

Environmental Impact: The technology provides a cleaner, more sustainable method of water treatment by reducing chemical and energy usage, thereby lowering the carbon footprint associated with water purification processes.

Economic Benefits: By optimizing water treatment processes, companies can achieve significant cost savings in terms of reduced energy and chemical consumption.

Additionally, the system's efficiency and low maintenance requirements contribute to lower overall operational costs.

Scalability and Versatility: The cavitator's design allows for easy integration into existing water treatment systems across various industries, making it a versatile solution for a wide range of purification needs.

Innovation in Water Purification: This use case exemplifies how hydrodynamic cavitation can revolutionize water treatment, setting a new standard for efficiency, sustainability, and environmental stewardship in industrial processes.

This use case illustrates the practical application and significant benefits of using a cavitator with hydrodynamic cavitation in sustainable water treatment and purification, showcasing its potential to advance clean technology and contribute positively to environmental sustainability.

Use Case: Optimizing Cooling Tower Efficiency with Hydrodynamic Cavitation

Background: Cooling towers are critical components in industrial, energy, and HVAC systems, providing cooling to processes, machinery, or buildings by rejecting waste heat to the atmosphere. Operators face challenges such as scaling, biofilm formation, and inefficient heat transfer, which can significantly reduce system efficiency, increase energy consumption, and elevate maintenance costs.

Innovation: The adoption of a cavitator using hydrodynamic cavitation technology in the recirculation lines of cooling towers presents a transformative solution. This technology enhances the physical properties of water, improving heat transfer efficiency, and significantly reducing the formation of limescale and biofilm without the extensive use of chemicals.

Application: An industrial facility with a critical dependence on cooling towers for its manufacturing process integrates the cavitator into its cooling tower recirculation system. The cavitator's hydrodynamic cavitation effect alters the water's characteristics, increasing its ability to reject heat and prevent the nucleation sites necessary for limescale and biofilm formation. As a result, the facility observes a notable improvement in the cooling tower's heat rejection capabilities, leading to a more stable and efficient process temperature control.

Significance:

Enhanced Heat Transfer Efficiency: The cavitator improves the cooling tower's performance by enhancing water's thermal conductivity, allowing for better heat rejection and energy efficiency.

Reduction in Limescale and Biofilm: By disrupting the formation of scale and biofilm, the cavitator reduces maintenance downtime, extends equipment lifespan, and decreases the need for chemical treatments, leading to significant cost savings and environmental benefits.

Energy Savings: Improved heat transfer efficiency and reduced scale formation directly translate into lower energy consumption. The cooling system operates more effectively, requiring less energy to achieve desired cooling levels.

Sustainability Impact: The reduction in chemical use for water treatment contributes to a more sustainable and environmentally friendly operation, aligning with corporate sustainability goals.

Outcomes: Following the installation of the cavitator, the cooling tower operator reports a significant decrease in operational issues related to scaling and biofilm, alongside improved system efficiency and reduced energy costs. The facility benefits from a more reliable cooling process, contributing to uninterrupted production schedules and enhanced overall operational sustainability.

This use case illustrates the substantial benefits of integrating hydrodynamic cavitation technology into cooling tower operations, showcasing its potential to revolutionize cooling system management through improved efficiency, reduced maintenance, and a commitment to environmental sustainability.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A cavitator comprising:
a converging section comprising a series of successively smaller cross-section compression-decompression stages; and
a diverging section fluidly coupled with the converging section; the diverging section comprising a series of successively larger cross-section decompression-compression stages.

2. The cavitator referenced in claim 1, wherein the internal cross-section area of each of the successively smaller compression-decompression stages narrows and wherein the internal cross-sectional area of each of the successively larger decompression-compression stages increases.

3. The cavitator of claim 2 wherein each of the cross-sectional areas are cylindrical.

4. The cavitator of claim 2 wherein at least one of the cross-section areas is non cylindrical shape.

5. The cavitator of claim 4 wherein; the non-cylindrical shape is triangular.

6. The cavitator of claim 4 wherein; the non-cylindrical shape is a sector of a circle.

7. The cavitator of claim 4 wherein; the non-cylindrical shape is a triangle with at least one rounded side.

8. The cavitator of claim 1, further comprising a junction having a hard angle, the hard angle comprising the angle between each compression surface and adjacent decompression surface.

9. The cavitator of claim 8, wherein at least one of the hard angles is between 10-80 degrees.

10. The cavitator of claim 8, wherein at least one of the hard angles is between 90-150 degrees inclusive.

11. The cavitator of claim 1 further comprising a throat section between the converging and the diverging sections, wherein the length of the throat section is between 2-4 times the internal cross-sectional diameter of the throat section.

12. The cavitator of claim 11, wherein the converging section has an inlet and an outlet, in which the inlet has an area 4-10 times the internal cross-sectional area of the throat.

13. The cavitator of claim 11, further comprising a plurality of converging, throat and diverging sections arranged such that there is a successive arrangement of converging, throat and diverging sections in series.

14. The cavitator of claim 1, wherein at least one of the compression-decompression stages has a starshaped cross-section with at least 4 spokes.

15. The cavitator of claim 1, wherein at least one of the compression-decompression stages has a starshaped cross-section with at least 8 spokes.

16. The cavitator of claim 1, wherein the different compression-decompression stages can be twisted clockwise and/or counterclockwise by angle of 3 to 45 degrees.

17. The cavitator of claim 1, wherein at least one of the compression-decompression stages is hexagonal shaped.

* * * * *